Figure 1:
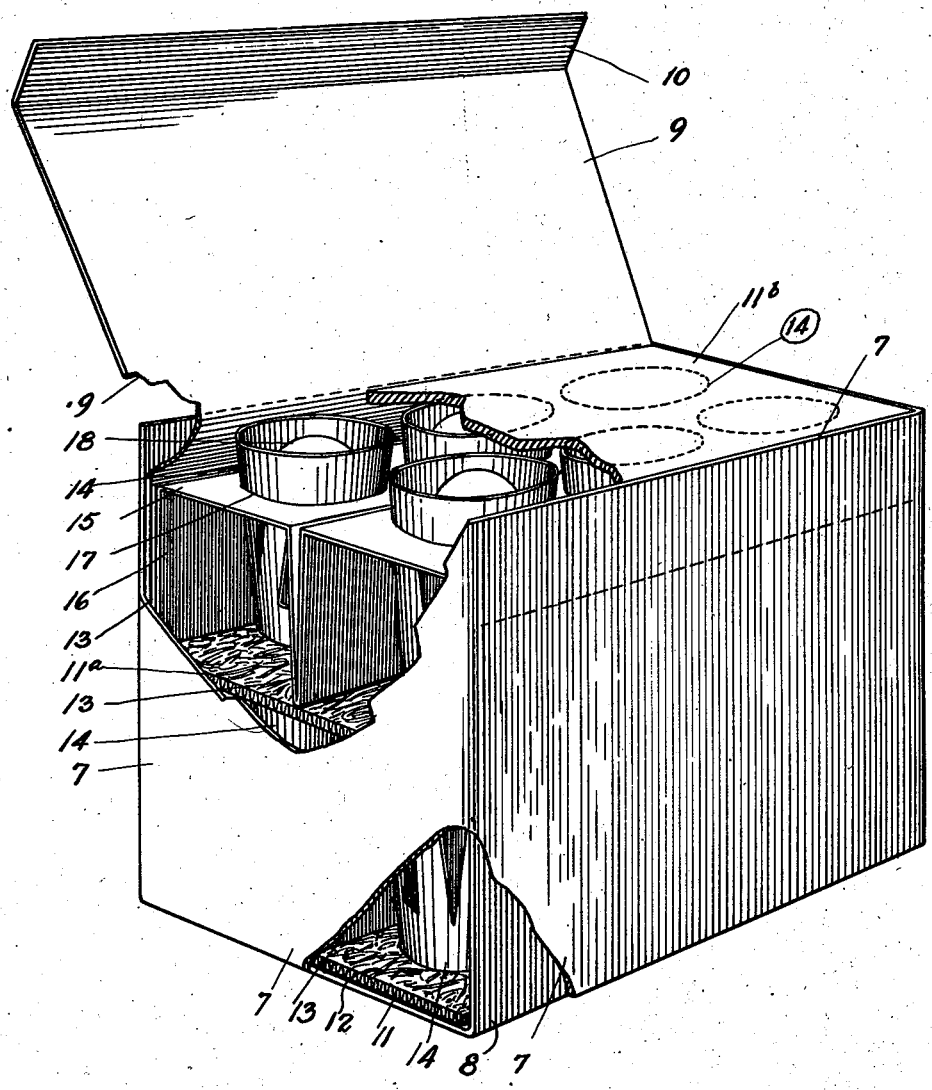

N. H. BECKSTROM.
EGG BOX OR CARRIER.
APPLICATION FILED JUNE 6, 1914.

1,170,729.

Patented Feb. 8, 1916.
2 SHEETS—SHEET 1.

WITNESSES.

INVENTOR.
Nels H. Beckstrom,
BY
ATTY.

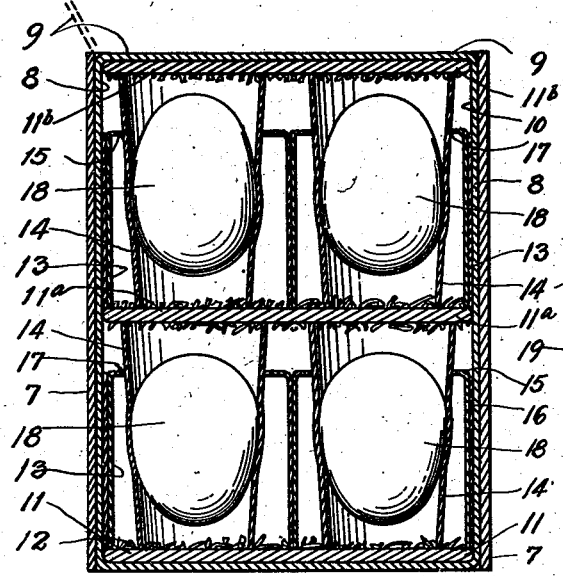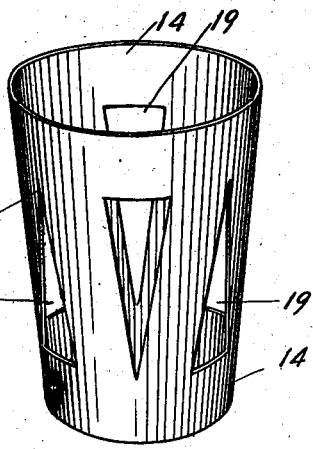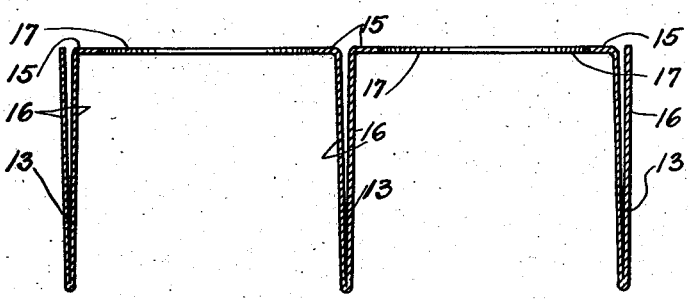

UNITED STATES PATENT OFFICE.

NELS H. BECKSTROM, OF CHICAGO, ILLINOIS.

EGG BOX OR CARRIER.

1,170,729.  Specification of Letters Patent.  Patented Feb. 8, 1916.

Application filed June 6, 1914. Serial No. 843,390.

*To all whom it may concern:*

Be it known that I, NELS H. BECKSTROM, a subject of the King of Sweden, residing at Chicago, in the county of Cook and State of Illinois, have invented certain new and useful Improvements in Egg Boxes or Carriers, of which the following is a specification.

This invention relates to improvements in a box or carrier for eggs, which is particularly intended for use in shipping eggs by parcels post, and it consists in certain peculiarities of the construction, novel arrangement and operation of the various parts thereof, as will be hereinafter more fully set forth and specifically claimed.

The principal object of the invention is to provide a box or carrier of the above named general character, which shall be simple and inexpensive in construction, strong, durable, compact in form and light in weight.

Another and important object of the invention is to provide means for yieldingly supporting the eggs within the box, out of contact with each other, and in such a manner as to hold them in their individual positions, no matter in which position the box may be placed, thus reducing the liability of breakage to a minimum in the shipment of the packages.

Other objects and advantages will be disclosed in the subjoined description and explanation.

In the accompanying drawings, which serve to illustrate an embodiment of the invention—Figure 1 is a perspective view of an egg box constructed according to my invention and illustrating parts thereof broken away to disclose the arrangement and construction of the interior mechanism; Fig. 2 is a cross sectional view of the box, showing the lid closed by continuous lines, and the position the lid will occupy when opened by dotted lines; Fig. 3 is an enlarged detached perspective view of one of the egg holders, and Fig. 4 is a detached cross sectional view of one of the supports for said egg holders.

Like numerals of reference refer to corresponding parts throughout the different views of the drawings.

The box or casing *per se* may be made of any well known construction and material, but by preference it consists, as shown in the drawings, of an outer casing 7 which may be made of any suitable size, form and material, but preferably rectangular in shape and of card or straw board 12 on account of the lightness of such material. This outer casing is open at its top and bottom and has fitted therein an inner box or casing 8, which is open at its ends, but is provided at its top with a lid 9, having at one of its edges a flap or extension 10 to meet or approximate the upper edge of the inner casing 8, which is located a slight distance below the upper front edge of the outer casing 7, as is clearly shown by dotted lines in Fig. 1 and by continuous lines in Fig. 2 of the drawings.

Located on the bottom of the inner casing 8 is a sheet of corrugated board 11, which may have on its upper surface a quantity of excelsior 12 or other suitable resilient packing material, which is held in place on said board by means of glue or any suitable adhesive. Located on the upper surface of the board 11 are the legs 13 of the lower support for the egg holders 14, which support is designated as a whole by the reference numeral 15, and is made of a single piece of flexible material such as card or straw board, and is bent downwardly at suitable points to form the legs 13, each of which by preference consists of two plies 16 of the material, but it is obvious that one of the plies of each of the outer legs may be omitted. The support 15 is provided in its upper surface with a series of openings 17 located in rows between the parallel and downwardly extended portions 16 which, as before stated, form the legs of said support. In each of the openings 17 is located an egg holder 14, each of which is made of flexible material such as card board and is downwardly tapered, as is clearly shown in Fig. 3 of the drawings. Each of the holders 14 is of sufficient size to receive an egg 18 and to clamp and hold the same between the ends of the holder, as will be readily understood by reference to Fig. 2 of the drawings. In order to give more resiliency or elasticity to the holders 14 each of the same is provided with the vertically disposed openings 19, which are substantially triangular in shape and disposed so that their apices will be presented alternately in opposite directions.

In filling the box or casing the lower support 15 after having been equipped with an egg holder 14 in each of the openings 17 of said support, is placed in the box or case so that the legs 13 of said support will rest on the upper surface of the board 11, when it is apparent that the lower ends of the holders 14 will also rest on said board or approximate the same, and that the upper ends of the holders will extend to about a horizontal line drawn through the middle of the box or casing. A board 11ª is then placed on the upper ends of the holders 14 of the lower support, when another support 15 of similar construction to the lower one and just above described and equipped with egg holders 14 of similar construction to those shown in Fig. 3 and above described, is placed on the upper surface of the board 11ª, as will be clearly understood by reference to Fig. 2 of the drawings. Before closing the lid 9, a board 11ᵇ provided on its lower surface with excelsior or the like may be placed on the upper end of the egg holders 14 carried by the upper support 15, when it is obvious that the lid 9 may be turned down to the position shown by continuous lines in Fig. 2 and fastened in place by any desired means.

While I have shown the box or case equipped with two superimposed supports 15, each of which carries a plurality of egg holders 14, yet it will be understood that I may employ one of said holders only, or any number of the same placed one above the other as described without departing from the spirit of the invention.

By employing an egg box or carrier constructed according to my improvements, it will be understood that the eggs 18 will be yieldingly clamped and held between the ends of the egg holders 14 so as to be out of contact with each other, as well as out of contact with any part of the casing which would impart concussion or impact directly to the eggs, thus avoiding the danger of breaking the same no matter how roughly the package may be handled in shipment. As the egg holders are detachable from the supports 15, it is manifest that the eggs can be readily removed one at a time, and if one of them should become broken the arrangement of the positions of the other eggs will not be interfered with.

Having thus fully described my invention what I claim as new and desire to secure by Letters Patent is—

As an improved article of manufacture, an egg holder consisting of a support made of a single piece of material provided with a plane surface having a plurality of openings therein and formed with integrally depending legs, and a tubular and downwardly tapered holder located in each of said openings, each of said holders having vertically elongated cut-out portions between its ends and engaging at the upper portion of the cut-out parts the said support.

NELS H. BECKSTROM.

Witnesses:
 CHAS. C. TILLMAN,
 A. S. PHILLIPS.